(12) United States Patent
Kim et al.

(10) Patent No.: US 11,814,514 B2
(45) Date of Patent: Nov. 14, 2023

(54) THERMOPLASTIC RESIN COMPOSITION AND MOLDED PRODUCT FORMED THEREFROM

(71) Applicant: LOTTE CHEMICAL CORPORATION, Seoul (KR)

(72) Inventors: Eun Jin Kim, Uiwang-si (KR); Dong Hui Chu, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 637 days.

(21) Appl. No.: 16/767,157

(22) PCT Filed: Dec. 18, 2018

(86) PCT No.: PCT/KR2018/016094
§ 371 (c)(1),
(2) Date: May 27, 2020

(87) PCT Pub. No.: WO2019/132371
PCT Pub. Date: Jul. 4, 2019

(65) Prior Publication Data
US 2020/0362160 A1    Nov. 19, 2020

(30) Foreign Application Priority Data
Dec. 26, 2017  (KR) .................. 10-2017-0179229

(51) Int. Cl.
| | | |
|---|---|---|
| *C08L 55/02* | (2006.01) | |
| *C08K 3/015* | (2018.01) | |
| *C08K 3/22* | (2006.01) | |
| *C08K 5/00* | (2006.01) | |
| *C08K 5/521* | (2006.01) | |
| *C08L 25/08* | (2006.01) | |
| *C08L 51/04* | (2006.01) | |

(52) U.S. Cl.
CPC .............. *C08L 55/02* (2013.01); *C08K 3/015* (2018.01); *C08K 3/22* (2013.01); *C08K 5/0058* (2013.01); *C08K 5/521* (2013.01); *C08L 25/08* (2013.01); *C08L 51/04* (2013.01); *C08K 2003/2296* (2013.01); *C08K 2201/005* (2013.01); *C08K 2201/006* (2013.01); *C08L 2203/20* (2013.01)

(58) Field of Classification Search
CPC .......... C08L 55/02; C08L 25/08; C08L 51/04; C08L 2203/20; C08K 3/015; C08K 3/22; C08K 5/0058; C08K 5/521; C08K 2003/2296; C08K 2201/005; C08K 2201/006
USPC ........................................................ 524/504
See application file for complete search history.

(56) References Cited

U.S. PATENT DOCUMENTS

| | | | |
|---|---|---|---|
| 4,163,018 A | 7/1979 | Tada et al. | |
| 2001/0009946 A1 | 7/2001 | Catsman et al. | |
| 2003/0235550 A1 | 12/2003 | Pan et al. | |
| 2004/0001797 A1 | 1/2004 | Saud et al. | |
| 2005/0271711 A1 | 12/2005 | Lynch et al. | |
| 2008/0275113 A1* | 11/2008 | Huetter .................. | A61P 31/12 514/502 |
| 2009/0202463 A1 | 8/2009 | Pan et al. | |
| 2009/0215854 A1 | 8/2009 | Pan et al. | |
| 2013/0272986 A1 | 10/2013 | Pan et al. | |

FOREIGN PATENT DOCUMENTS

| | | |
|---|---|---|
| CN | 1328591 A | 12/2001 |
| CN | 1934189 A | 3/2007 |
| JP | 53-84919 A | 7/1978 |
| JP | 08-208945 A | 8/1996 |
| JP | 09-012836 A | 1/1997 |
| JP | H0912836 A * | 1/1997 |
| JP | 11-029618 A | 2/1999 |
| JP | 11-035787 A | 2/1999 |
| JP | 11-263705 A | 9/1999 |
| JP | 2005-112994 A | 4/2005 |
| JP | 2005-530857 A | 10/2005 |
| JP | 2010-70590 A | 4/2010 |
| JP | 2010-524976 A | 7/2010 |
| KR | 10-0988999 | 10/2010 |
| KR | 10-2017-0045030 A | 4/2017 |
| WO | 2019/132371 A1 | 7/2019 |

OTHER PUBLICATIONS

Prasanna, V.L. et al., "Insight into the Mechanism of Antibacterial Activity of ZnO: Surface Defects Mediated Reactive Oxygen Species Even in the Dark", Langmuir 2015, vol. 31, pp. 9155-9162. (Year: 2015).*

Huang, L. et al., "Methanol synthesis over Cu/ZnO catalysts prepared by ball milling", Catalysis Letters, vol. 48, (1997), pp. 55-59. (Year: 1997).*

International Search Report in counterpart International Application No. PCT/KR2018/016094 dated Apr. 2, 2019, pp. 1-7.

Prasanna, V. L. Etc.. "Insight into the Mechanism of Antibacterial Activity of ZnO: Surface Defects Mediated Reactive Oxygen Species Even in the Dark", Langumir, 2015, Vo. 31., p. 9155-9162.

(Continued)

*Primary Examiner* — Ling Siu Choi
*Assistant Examiner* — Ronald Grinsted
(74) *Attorney, Agent, or Firm* — Additon, Pendleton & Witherspoon, P.A.

(57) ABSTRACT

A thermoplastic resin composition of the present invention comprises: a rubber modified vinyl-based graft copolymer; an aromatic vinyl-based copolymer resin; zinc oxide having an average particle size of approximately 0.5-3 μm and a specific surface area BET of approximately 1-10 $m^2/g$; and a C10-20 alkyl phosphate. The thermoplastic resin composition has excellent weather resistance, antibacterial property, impact resistance, flowability and the like.

14 Claims, No Drawings

(56) References Cited

OTHER PUBLICATIONS

Office Action in counterpart Japanese Application No. 2020-531658 dated Sep. 13, 2022, pp. 1-4.
Stabilizer for Polymeric Materials Thermal Stabilizer vol. 68 No. 5 pp. 318-326 (1995) (11 pages) [With English translation of Conclusion].
Office Action in counterpart Chinese Application No. 201880083919.8 dated Oct. 9, 2022, pp. 1-4.

* cited by examiner

THERMOPLASTIC RESIN COMPOSITION AND MOLDED PRODUCT FORMED THEREFROM

CROSS-REFERENCE TO RELATED APPLICATIONS

This application claims priority to and the benefit of International Application No. PCT/KR2018/016094, filed Dec. 18, 2018, which published as WO 2019/132371 on Jul. 4, 2019, and Korean Patent Application No. 10-2017-0179229, filed in the Korean Intellectual Property Office on Dec. 26, 2017, the entire disclosure of each of which is incorporated herein by reference.

TECHNICAL FIELD

The present invention relates to a thermoplastic resin composition and a molded product formed therefrom. More particularly, the present invention relates to a thermoplastic resin composition which has good weather resistance, antibacterial properties, impact resistance, flowability, and the like, and a molded product formed therefrom.

BACKGROUND ART

As a thermoplastic resin, a rubber-modified aromatic vinyl copolymer resin such as an acrylonitrile-butadiene-styrene copolymer resin (ABS resin) has good properties in terms of mechanical properties, processability, external appearance, and the like, and is broadly used as interior/exterior materials for electric/electronic products, automobiles, buildings, and the like.

However, home appliance electronic products manufactured using such a rubber-modified aromatic styrene-based copolymer can suffer from yellowing discoloration and propagation of bacteria on the surfaces thereof over time. Use of an antibacterial agent, a weathering stabilizer and the like to improve weather resistance and antibacterial properties of a resin composition can cause deterioration in compatibility and impact resistance, and generation of cracks upon injection molding.

Therefore, there is a need for development of a thermoplastic resin composition which has good properties in terms of weather resistance, antibacterial properties, impact resistance, flowability, and the like.

The background technique of the present invention is disclosed in Korean Patent No. 10-0988999 and the like.

DISCLOSURE

Technical Problem

It is one aspect of the present invention to provide a thermoplastic resin composition which has good properties in terms of weather resistance, antibacterial properties, impact resistance, flowability, and the like.

It is another aspect of the present invention to provide a molded product formed of the thermoplastic resin composition.

The above and other aspects of the present invention can be achieved by the present invention described below.

Technical Solution

1. One aspect of the present invention relates to a thermoplastic resin composition. The thermoplastic resin composition includes: a rubber-modified vinyl graft copolymer; an aromatic vinyl copolymer resin; zinc oxide having an average particle diameter (D50) of about 0.5 μm to about 3 μm and a BET specific surface area of about 1 m$^2$/g to about 10 m$^2$/g; and a $C_{10}$ to $C_{20}$ alkyl phosphate.

2. In Embodiment 1, the thermoplastic resin composition may include: about 100 parts by weight of a thermoplastic resin including about 10 wt % to about 40 wt % of the rubber-modified vinyl graft copolymer and about 60 wt % to about 90 wt % of the aromatic vinyl copolymer resin; about 0.1 to about 10 parts by weight of the zinc oxide; and about 0.01 to about 5 parts by weight of the alkyl phosphate.

3. In Embodiment 1 or 2, the rubber-modified vinyl graft copolymer may be prepared by graft polymerization of a monomer mixture including an aromatic vinyl monomer and a vinyl cyanide monomer to a rubber polymer.

4. In Embodiments 1 to 3, the aromatic vinyl copolymer resin may be a polymer of an aromatic vinyl monomer and a monomer copolymerizable with the aromatic vinyl monomer.

5. In Embodiments 1 to 4, the zinc oxide may have a peak intensity ratio (B/A) of about 0.01 to about 1.0, where A indicates a peak in the wavelength range of 370 nm to 390 nm and B indicates a peak in the wavelength range of 450 nm to 600 nm in photoluminescence measurement.

6. In Embodiments 1 to 5, the zinc oxide may have a peak position degree (2θ) in the range of about 35° to about 37° and a crystallite size of about 1,000 Å to about 2,000 Å in X-ray diffraction (XRD) analysis, as calculated by Equation 1:

$$\text{Crystallite size } (D) = \frac{K\lambda}{\beta \cos \theta} \quad \text{[Equation 1]}$$

where K is a shape factor, λ, is an X-ray wavelength, β is an FWHM value (degree) of an X-ray diffraction peak, and θ is a peak position degree.

7. In Embodiments 1 to 6, the zinc oxide and the alkyl phosphate may be present in a weight ratio of about 4:1 to about 40:1.

8. In Embodiments 1 to 7, the thermoplastic resin composition may have a color variation (ΔE) of about 0.5 to about 1.7, as calculated by Equation 2 based on initial color values ($L_0^*$, $a_0^*$, $b_0^*$) measured on an injection-molded specimen having a size of 50 mm×90 mm×3 mm and color values ($L_1^*$, $a_1^*$, $b_1^*$) of the specimen measured after weathering testing for 300 hours in accordance with ASTM D4459.

$$\text{Color variation } (\Delta E) = \sqrt{(\Delta L^*)^2 + (\Delta a^*)^2 + (\Delta b^*)^2} \quad \text{[Equation 2]}$$

where ΔL* is a difference ($L_1^* - L_0^*$) between L* values before and after weathering test, Δa* is a difference ($a_1^* - a_0^*$) between a* values before and after weathering test, and Δb* is a difference ($b_1^* - b_0^*$) between b* values before and after weathering test.

9. In Embodiments 1 to 8, the thermoplastic resin composition may have an antibacterial activity of about 2 to about 7 against each of *Staphylococcus aureus* and *Escherichia coli*, as measured after inoculation of 5 cm×5 cm specimens with *Staphylococcus aureus* and *Escherichia coli*, respectively, and culturing under conditions of 35° C. and 90% RH for 24 hours in accordance with JIS Z 2801.

10. In Embodiments 1 to 9, the thermoplastic resin composition may have a notched Izod impact strength of about 17 kgf·cm/cm to about 30 kgf·cm/cm, as measured on a 6.4 mm thick specimen at 23° C. in accordance with ASTM D256.

11. In Embodiments 1 to 10, the thermoplastic resin composition may have a notched Izod impact strength of about 10 kgf·cm/cm to about 20 kgf·cm/cm, as measured on a 6.4 mm thick specimen at −30° C. in accordance with ASTM D256.

12. In Embodiments 1 to 11, the thermoplastic resin composition may have a melt-flow index (MI) of about 2 g/10 min to about 5 g/10 min, as measured under conditions of 200° C. and a load of 5 kg in accordance with ASTM D1238.

13. Another aspect of the present invention relates to a molded product. The molded product is formed of the thermoplastic resin composition according to any one of Embodiments 1 to 12.

Advantageous Effects

The present invention provides a thermoplastic resin composition which has good properties in terms of weather resistance, antibacterial properties, impact resistance, flowability, and the like, and a molded product formed of the same.

BEST MODE

Hereinafter, embodiments of the present invention will be described in detail.

A thermoplastic resin composition according to the present invention includes: (A) a thermoplastic resin including (A1) a rubber-modified vinyl graft copolymer and (A2) an aromatic vinyl copolymer resin; (B) zinc oxide; and (C) an alkyl phosphate.

As used herein to represent a specific numerical range, the expression "a to b" means "≥ a and ≤b".

(A) Thermoplastic Resin

The thermoplastic resin according to the present invention may be a rubber-modified vinyl graft copolymer including (A1) the rubber-modified vinyl graft copolymer (A1) and the aromatic vinyl copolymer resin (A2).

(A1) Rubber-Modified Vinyl Graft Copolymer

The rubber-modified vinyl graft copolymer according to one embodiment of the invention serves to improve impact resistance and flowability of the thermoplastic resin composition, and may be obtained by graft polymerization of a monomer mixture including an aromatic vinyl monomer and a vinyl cyanide monomer to a rubber polymer. For example, the rubber-modified vinyl graft copolymer may be obtained by graft polymerization of the monomer mixture including the aromatic vinyl monomer and the vinyl cyanide monomer to the rubber polymer, in which the monomer mixture may further include a monomer for imparting processability and heat resistance to the monomer mixture, as needed. Here, polymerization may be performed by any polymerization method known in the art, such as emulsion polymerization, suspension polymerization, and the like. In addition, the rubber-modified vinyl graft copolymer may have a core (rubber polymer)-shell (copolymer of the monomer mixture) structure.

In some embodiments, the rubber polymer may include, for example, diene rubbers, such as polybutadiene, poly (styrene-butadiene), and poly(acrylonitrile-butadiene); saturated rubbers obtained by adding hydrogen to the diene rubbers; isoprene rubbers; acrylate rubbers including $C_2$ to $C_{10}$ alkyl (meth)acrylate rubbers, a copolymer of a $C_2$ to $C_{10}$ alkyl (meth)acrylate and styrene, and combinations thereof; and ethylene-propylene-diene monomer terpolymer (EPDM), without being limited thereto. These may be used alone or as a mixture thereof. For example, the rubber polymer may include diene rubbers and acrylate rubbers, specifically butadiene rubber and butyl acrylate rubber. The rubber polymer (rubber particle) may have an average particle diameter of about 0.05 μm to about 6 for example, about 0.15 μm to about 4 specifically about 0.25 μm to about 3.5 Within this range, the thermoplastic resin composition can have good properties in terms of impact resistance, external appearance, and the like. Here, the average particle diameter (z-average) of the rubber polymer (rubber particles) may be measured by a light scattering method in a latex state. Specifically, a rubber polymer latex is filtered through a mesh to remove coagulum generated during polymerization of the rubber polymer. Then, a mixed solution of 0.5 g of the latex and 30 ml of distilled water is placed in a 1,000 ml flask, which in turn is filled with distilled water to prepare a specimen. Then, 10 ml of the specimen is transferred to a quartz cell, followed by measurement of the average particle diameter of the rubber polymer using a light scattering particle analyzer (Malvern Co., Ltd., Nano-zs).

In some embodiments, the rubber polymer may be present in an amount of about 5 wt % to about 65 wt %, for example, about 10 wt % to about 60 wt %, specifically about 20 wt % to about 50 wt %, based on the total weight (100 wt %) of the rubber-modified vinyl graft copolymer, and the monomer mixture (including the aromatic vinyl monomer and the vinyl cyanide monomer) may be present in an amount of about 35 wt % to about 95 wt %, for example, about 40 wt % to about 90 wt %, specifically about 50 wt % to about 80 wt %, based on 100 wt % of the rubber-modified vinyl graft copolymer. Within this range, the thermoplastic resin composition can have good properties in terms of impact resistance, strength, flowability, and the like.

In some embodiments, the aromatic vinyl monomer may be graft copolymerizable with the rubber polymer and may include, for example, styrene, α-methyl styrene, β-methyl styrene, p-methyl styrene, p-t-butyl styrene, ethyl styrene, vinylxylene, monochlorostyrene, dichlorostyrene, dibromostyrene, vinyl naphthalene, and the like. These may be used alone or as a mixture thereof. The aromatic vinyl monomer may be present in an amount of about 10 wt % to about 90 wt %, for example, about 40 wt % to about 90 wt %, based on 100 wt % of the monomer mixture. Within this range, the thermoplastic resin composition can have good properties in terms of processability, impact resistance, and the like.

In some embodiments, the vinyl cyanide monomer is copolymerizable with the aromatic vinyl monomer, and may include, for example, acrylonitrile, methacrylonitrile, ethacrylonitrile, phenyl acrylonitrile, α-chloroacrylonitrile, fumaronitrile, and the like. These may be used alone or as a mixture thereof. For example, the vinyl cyanide monomer may include acrylonitrile, methacrylonitrile, and the like. The vinyl cyanide monomer may be present in an amount of about 10 wt % to about 90 wt %, for example, about 10 wt % to about 60 wt %, based on 100 wt % of the monomer mixture. Within this range, the thermoplastic resin composition can have good properties in terms of chemical resistance, mechanical properties, and the like.

In some embodiments, the monomer for imparting processability and heat resistance may include, for example, (meth)acrylic acid, maleic anhydride, and N-substituted maleimide, without being limited thereto. The monomer for imparting processability and heat resistance may be present in an amount of about 15 wt % or less, for example, about 0.1 wt % to about 10 wt %, based on 100 wt % of the monomer mixture. Within this range, the monomer for imparting processability and heat resistance can impart processability and heat resistance to the thermoplastic resin composition without deterioration in other properties.

In some embodiments, the rubber-modified vinyl graft copolymer may include, for example, an acrylate-styrene-butadiene graft copolymer (g-ABS copolymer) obtained by grafting styrene and acrylonitrile to a butadiene rubber polymer, and the like.

In some embodiments, the rubber-modified vinyl graft copolymer may be present in an amount of about 10 wt % to about 40 wt %, for example, about 15 wt % to about 35 wt %, based on 100 wt % of the thermoplastic resin (A). Within this range, the thermoplastic resin composition can exhibit good properties in terms of external appearance, impact resistance, flowability (molding processability), and balance therebetween.

(A2) Aromatic Vinyl Copolymer Resin

According to the embodiment of the invention, the aromatic vinyl copolymer resin may be an aromatic vinyl copolymer resin used for a typical rubber-modified vinyl graft copolymer resin. For example, the aromatic vinyl copolymer resin may be a polymer of a monomer mixture including an aromatic vinyl monomer and a monomer copolymerizable with the aromatic vinyl monomer, such as a vinyl cyanide monomer.

In some embodiments, the aromatic vinyl copolymer resin may be prepared by mixing the aromatic vinyl monomer with the monomer copolymerizable with the aromatic vinyl monomer, followed by polymerization of the mixture. Here, polymerization may be carried out by any well-known polymerization method, such as emulsion polymerization, suspension polymerization, bulk polymerization, and the like.

In some embodiments, the aromatic vinyl monomer may include, for example, styrene, α-methylstyrene, β-methylstyrene, p-methylstyrene, p-t-butylstyrene, ethylstyrene, vinylxylene, monochlorostyrene, dichlorostyrene, dibromostyrene, and vinyl naphthalene. These may be used alone or as a mixture thereof. The aromatic vinyl monomer may be present in an amount of about 20 wt % to about 90 wt %, for example, about 30 wt % to about 80 wt %, based on 100 wt % of the aromatic vinyl copolymer resin. Within this range, the thermoplastic resin composition can exhibit good properties in terms of impact resistance, flowability, and the like.

In some embodiments, the monomer copolymerizable with the aromatic vinyl monomer may include a vinyl cyanide monomer, for example, acrylonitrile, methacrylonitrile, ethacrylonitrile, phenylacrylonitrile, α-chloroacrylonitrile, fumaronitrile, and the like. These may be used alone or as a mixture thereof. The monomer copolymerizable with the aromatic vinyl monomer may be present in an amount of about 10 wt % to about 80 wt %, for example, about 20 wt % to about 70 wt %, based on 100 wt % of the aromatic vinyl copolymer resin. Within this range, the thermoplastic resin composition can exhibit good properties in terms of impact resistance, flowability, and the like.

In some embodiments, the aromatic vinyl copolymer resin may have a weight average molecular weight (Mw) of about 10,000 g/mol to about 300,000 g/mol, for example, about 15,000 g/mol to about 150,000 g/mol, as measured by gel permeation chromatography (GPC). Within this range, the thermoplastic resin exhibits good properties in terms of mechanical strength, flowability, and the like. Alternatively, the aromatic vinyl copolymer resin may be a mixture of two kinds of aromatic vinyl copolymer resins having different weight average molecular weights. For example, the aromatic vinyl copolymer resin may be a mixture of a resin having a weight average molecular weight (Mw) of about 60,000 g/mol to about 100,000 g/mol and a resin having a weight average molecular weight (Mw) of about 120,000 g/mol to about 180,000 g/mol.

In some embodiments, the aromatic vinyl copolymer resin (A2) may be present in an amount of about 60 wt % to about 90 wt %, for example, about 65 wt % to about 85 wt %, based on 100 wt % of the thermoplastic resin (A). Within this range, the thermoplastic resin composition can exhibit good properties in terms of external appearance, impact resistance, flowability (molding processability), and balance therebetween.

(B) Zinc Oxide

According to the present invention, zinc oxide serves to provide significant improvement in weather resistance, antibacterial properties and impact strength of the thermoplastic resin composition together with the alkyl phosphate. The zinc oxide may have an average particle diameter (D50) of about 0.5 μm to about 3 μm, for example, about 0.8 μm to about 3 μm, as measured using a particle size analyzer (Laser Diffraction Particle Size Analyzer LS I3 320, Beckman Coulter Co., Ltd.), a BET specific surface area of about 1 m$^2$/g to about 10 m$^2$/g, for example, about 1 m$^2$/g to about 7 m$^2$/g, as measured by a BET analyzer (Surface Area and Porosity Analyzer ASAP 2020, Micromeritics Co., Ltd.), and a purity of about 99% or more. Within these ranges, the thermoplastic resin composition can have good weather resistance, antibacterial properties, and the like.

The zinc oxide may have various shapes. For example, the zinc oxide may have a shape selected from among, for example, a spherical shape, a plate shape, a rod shape, and a combination thereof.

In some embodiments, the zinc oxide may have a peak intensity ratio (B/A) of about 0.01 to about 1.0, for example, about 0.1 to about 1.0, specifically about 0.2 to about 0.7, where A indicates a peak in the wavelength range of 370 nm to 390 nm and B indicates a peak in the wavelength range of 450 nm to 600 nm in photoluminescence measurement. Within this range, the thermoplastic resin composition can have good weather resistance, antibacterial properties, and the like.

In some embodiments, the zinc oxide may have a peak position degree (2θ) in the range of about 35° to about 37° and a crystallite size of about 1,000 Å to about 2,000 Å, for example, about 1,200 Å to about 1,800 Å, in X-ray diffraction (XRD) analysis, as calculated by Scherrer's equation (Equation 1) with reference to a measured FWHM value (full width at half maximum of a diffraction peak). Within this range, the thermoplastic resin composition can have good initial color, weather resistance, antibacterial properties, and the like.

$$\text{Crystallite size } (D) = \frac{K\lambda}{\beta \cos \theta} \qquad \text{[Equation 1]}$$

where K is a shape factor, λ is an X-ray wavelength, β is an FWHM value (degree) of an X-ray diffraction peak, and θ is a peak position degree.

In some embodiments, the zinc oxide may be prepared by melting metallic zinc in a reactor, heating the molten zinc to about 850° C. to about 1,000° C., for example, about 900° C. to about 950° C., to vaporize the molten zinc, injecting oxygen gas into the reactor, cooling the reactor to about 20°

C. to about 30° C., and heating the reactor to about 400° C. to about 900° C., for example, 500° C. to about 800° C., for about 30 minutes to about 150 minutes, for example, about 60 minutes to about 120 minutes.

In some embodiments, the zinc oxide may be present in an amount of about 0.1 parts by weight to about 10 parts by weight, for example, about 1 part by weight to about 7 parts by weight, relative to about 100 parts by weight of the thermoplastic resin (A). Within this range, the thermoplastic resin composition can have good weather resistance, antibacterial properties, and the like.

(C) Alkyl Phosphate

According to the present invention, the alkyl phosphate serves to improve impact resistance, weather resistance, and antibacterial properties of the thermoplastic resin composition together with the zinc oxide and may be a $C_{10}$ to $C_{20}$ alkyl phosphate.

In some embodiments, the alkyl phosphate may include, for example, dodecyl phosphate, tetradecyl phosphate, hexadecyl phosphate, octadecyl phosphate, and the like. These may be used alone or as a mixture thereof. For example, octadecyl phosphate may be used.

In some embodiments, the alkyl phosphate (D) may be present in an amount of about 0.01 parts by weight to about 5 parts by weight, for example, about 0.05 parts by weight to about 2 parts by weight, relative to about 100 parts by weight of the thermoplastic resin (A). Within this range, the thermoplastic resin composition can have good properties in terms of impact resistance, weather resistance, antibacterial properties, and the like.

In some embodiments, the zinc oxide (B) and the alkyl phosphate (C) may be present in a weight ratio (B:C) of about 4:1 to about 40:1, for example, about 5:1 to about 20:1. Within this range, the thermoplastic resin composition can have further improved impact resistance.

The thermoplastic resin composition according to one embodiment of the invention may further include additives used in typical thermoplastic resin compositions. Examples of the additives may include flame retardants, fillers, antioxidants, anti-dripping agents, lubricants, release agents, nucleating agents, antistatic agents, stabilizers, pigments, dyes, and mixtures thereof, without being limited thereto. The additives may be present in an amount of about 0.001 parts by weight to about 40 parts by weight, for example, about 0.1 parts by weight to about 10 parts by weight, relative to about 100 parts by weight of the thermoplastic resin.

The thermoplastic resin composition according to one embodiment of the invention may be prepared in pellet form by mixing the aforementioned components, followed by melt extrusion in a typical twin-screw extruder at about 200° C. to about 280° C., for example, about 220° C. to about 250° C.

In some embodiments, the thermoplastic resin composition may have a color variation ($\Delta E$) of about 0.5 to about 1.7, for example, about 0.9 to about 1.5, as calculated by Equation 2 based on initial color values ($L_0^*$, $a_0^*$, $b_0^*$) measured on an injection-molded specimen having a size of 50 mm×90 mm×3 mm using a colorimeter and color values ($L_1^*$, $a_1^*$, $b_1^*$) of the specimen measured in the same manner as above after weathering testing for 300 hours in accordance with ASTM D4459.

$$\text{Color variation } (\Delta E) = \sqrt{(\Delta L^*)^2 + (\Delta a^*)^2 + (\Delta b^*)^2} \quad \text{[Equation 2]}$$

where $\Delta L^*$ is a difference ($L_1^* - L_0^*$) between $L^*$ values before and after weathering test, $\Delta a^*$ is a difference ($a_1^* - a_0^*$) between $a^*$ values before and after weathering test, and $\Delta b^*$ is a difference ($b_1^* - b_0^*$) between $b^*$ values before and after weathering test.

In some embodiments, the thermoplastic resin composition may have an antibacterial activity of about 2 to about 7, for example, about 4 to about 6, against each of *Staphylococcus aureus* and *Escherichia coli*, as measured after inoculation of 5 cm×5 cm specimens with *Staphylococcus aureus* and *Escherichia coli*, respectively, and culturing under conditions of 35° C. and 90% RH (relative humidity) for 24 hours in accordance with JIS Z 2801.

In some embodiments, the thermoplastic resin composition may have a notched Izod impact strength of about 17 kgf·cm/cm to about 30 kgf·cm/cm, for example, about 18 kgf·cm/cm to about 25 kgf·cm/cm, as measured on a 6.4 mm thick specimen at 23° C. in accordance with ASTM D256.

In some embodiments, the thermoplastic resin composition may have a notched Izod impact strength of about 10 kgf·cm/cm to about 20 kgf·cm/cm, for example, about 10 kgf·cm/cm to about 15 kgf·cm/cm, as measured on a 6.4 mm thick specimen at −30° C. in accordance with ASTM D256.

In some embodiments, the thermoplastic resin composition may have a melt-flow index (MI) of about 2 g/10 min to about 5 g/10 min, for example, about 2.2 g/10 min to about 4 g/10 min, as measured under conditions of 200° C. and a load of 5 kg in accordance with ASTM D1238.

A molded product according to the present invention is formed of the thermoplastic resin composition set forth above. The thermoplastic resin composition may be prepared in pellet form. The prepared pellets may be produced into various molded products (articles) by various molding methods, such as injection molding, extrusion molding, vacuum molding, and casting. These molding methods are well known to those skilled in the art. The molded product has good weather resistance, antibacterial properties, impact resistance, flowability (moldability), and balance therebetween and thus can be advantageously used as interior/exterior materials for electrical/electronic products, interior/exterior materials for automobiles, and exterior materials for buildings, for example, interior/exterior materials for electrical/electronic products having a complex structure.

MODE FOR INVENTION

Next, the present invention will be described in more detail with reference to some examples. It should be understood that these examples are provided for illustration only and are not to be in any way construed as limiting the present invention.

Example

Details of components used in Examples and Comparative Examples are as follows:

(A) Thermoplastic Resin (A1) Rubber-Modified Vinyl Graft Copolymer

A g-ABS copolymer obtained by graft-copolymerization of 55 wt % of styrene and acrylonitrile (weight ratio: 75/25) to 45 wt % of butadiene rubber (average particle size: 320 nm) was used.

(A2) Aromatic Vinyl Copolymer Resin

A SAN resin (weight average molecular weight: 80,000 g/mol) obtained by polymerization of 70 wt % of styrene and 30 wt % of acrylonitrile was used.

(A3) Aromatic Vinyl Copolymer Resin

A SAN resin (weight average molecular weight: 150,000 g/mol) obtained by polymerization of 70 wt % of styrene and 30 wt % of acrylonitrile was used.

(B) Zinc Oxide (B1) Metallic zinc was melted in a reactor, followed by heating to 900° C. to vaporize the molten zinc, and then oxygen gas was injected into the reactor, followed by cooling to room temperature (25° C.) to obtain a primary intermediate. Then, the primary intermediate was subjected to heat treatment at 700° C. for 90 minutes, followed by cooling to room temperature (25° C.), thereby preparing zinc oxide.

(B2) Zinc oxide (Manufacturer: Ristecbiz Co., Ltd., Product name: RZ-950) was used.

(B3) Zinc oxide (Manufacture: Hanil Chemical Ind Co., Ltd., Product name: TE30) was used.

For each of the zinc oxides B1, B2, B3, average particle diameter, BET specific surface area, purity, peak intensity ratio (B/A) of peak B in the wavelength range of 450 nm to 600 nm to peak A in the wavelength range of 370 nm to 390 nm in photoluminescence measurement, and crystallite size were measured. Results are shown in Table 1.

(C) Phosphate (C1) Octadecyl phosphate (Manufacture: ADEKA Corporation, Product name: ADK STAB AX-71) was used.

(C2) Triphenyl phosphate (Manufacture: DAIHACHI, Product name: PHOSFLEX TPP) was used.

TABLE 1

|  | (B1) | (B2) | (B3) |
|---|---|---|---|
| Average particle diameter (μm) | 1.2 | 0.890 | 3.7 |
| BET surface area (m²/g) | 4 | 15 | 14 |
| Purity (%) | 99 | 97 | 97 |
| PL peak intensity ratio (B/A) | 0.28 | 9.8 | 9.5 |
| Crystallite size (Å) | 1,417 | 503 | 489 |

Property Evaluation (1) Average particle diameter (unit: μm): Average particle diameter (volume average) was measured using a particle size analyzer (Laser Diffraction Particle Size Analyzer LS 13 320, Beckman Coulter Co., Ltd.).

(2) BET surface area (unit: m²/g): BET surface area was measured by a nitrogen gas adsorption method using a BET analyzer (Surface Area and Porosity Analyzer ASAP 2020, Micromeritics Co., Ltd.).

(3) Purity (unit: %): Purity was measured by thermogravimetric analysis (TGA) based on the weight of remaining material at 800° C.

(4) PL peak intensity ratio (B/A): Spectrum emitted upon irradiation of a specimen using a He—Cd laser (KIMMON, 30 mW) at a wavelength of 325 nm at room temperature was detected by a CCD detector in a photoluminescence measurement method, in which the CCD detector was maintained at −70° C. A peak intensity ratio (B/A) of peak B in the wavelength range of 450 nm to 600 nm to peak A in the wavelength range of 370 nm to 390 nm was measured. Here, an injection molded specimen was irradiated with laser beams without separate treatment upon PL analysis, and zinc oxide powder was compressed in a pelletizer having a diameter of 6 mm to prepare a flat specimen.

(5) Crystallite size (unit: Å): Crystallite size was measured using a high-resolution X-ray diffractometer (PRO-MRD, X'pert Inc.) at a peak position degree (2θ) in the range of 35° to 37° and calculated by Scherrer's equation (Equation 1) with reference to a measured FWHM value (full width at half maximum of a diffraction peak). Here, both a powder form and an injection molded specimen could be measured. For more accurate analysis, the injection molded specimen was subjected to heat treatment in air at 600° C. for 2 hours to remove a polymer resin therefrom before XRD analysis.

$$\text{Crystallite size } (D) = \frac{K\lambda}{\beta \cos \theta} \qquad \text{[Equation 1]}$$

where K is a shape factor, λ, is an X-ray wavelength, β is an FWHM value (degree) of an X-ray diffraction peak, and θ is a peak position degree.

Examples 1 to 5 and Comparative Examples 1 to 5

The aforementioned components were mixed in amounts as listed in Tables 2 and 3, followed by extrusion at 230° C., thereby preparing a thermoplastic resin composition in pellet form. Here, extrusion was performed using a twin-screw extruder (L/D: 36, Φ: 45 mm). The prepared pellets were dried at 80° C. for 2 hours or more and then subjected to injection molding using a 6 oz. injection machine (molding temperature: 230° C., mold temperature: 60° C.), thereby preparing a specimen. The prepared specimen was evaluated as to the following properties. Results are shown in Tables 2 and 3.

Property Evaluation (1) Weather resistance (color variation (ΔE)): For determination of color variation, initial color values $L_0^*$, $a_0^*$, $b_0^*$ were measured on an injection molded specimen having a size of 50 mm×90 mm×3 mm using a colorimeter (KONICA MINOLTA, CM-3700 Å), followed by weathering testing for 300 hours in accordance with ASTM D4459, and then color values $L_1^*$, $a_1^*$, $b_1^*$ of the specimen were measured in the same manner as above. Thereafter, color variation (ΔE) was calculated by Equation 2:

$$\text{Color variation } (\Delta E) = \sqrt{(\Delta L^*)^2 + (\Delta a^*)^2 + (\Delta b^*)^2} \qquad \text{[Equation 2]}$$

where ΔL* is a difference ($L_1^* - L_0^*$) between L* values before and after weathering test, Δa* is a difference ($a_1^* - a_0^*$) between a* values before and after weathering test, and Δb* is a difference ($b_1^* - b_0^*$) between b* values before and after weathering test.

(2) Antibacterial activity: In accordance with JIS Z 2801, 5 cm×5 cm specimens were inoculated with *Staphylococcus aureus* and *Escherichia coli*, respectively, and then subjected to culturing under conditions of 35° C. and 90% RH for 24 hours, followed by calculation of antibacterial activity.

(3) Notched Izod impact strength (unit: kgf·cm/cm): Notched Izod impact strength was measured on a 6.4 mm thick Izod specimen at 23° C. and −30° C. in accordance with ASTM D256.

(4) Melt-flow Index (MI, unit: g/10 min): Melt-flow index was measured under conditions of 200° C. and a load of 5 kg in accordance with ASTM D1238.

TABLE 2

|  |  | Example |  |  |  |  |
|---|---|---|---|---|---|---|
|  |  | 1 | 2 | 3 | 4 | 5 |
| (A) (wt %) | (A1) | 23 | 23 | 23 | 23 | 23 |
|  | (A2) | 27 | 27 | 27 | 27 | 27 |
|  | (A3) | 50 | 50 | 50 | 50 | 50 |
| (B) (parts by weight) | (B1) | 4 | 4 | 4 | 1 | 8 |
|  | (B2) | — | — | — | — | — |
|  | (B3) | — | — | — | — | — |
| (C) (parts by weight) | (C1) | 0.1 | 0.3 | 0.5 | 0.25 | 0.25 |
|  | (C2) | — | — | — | — | — |
| Color variation (ΔE) |  | 1.5 | 1.3 | 1.3 | 1.4 | 1.3 |
| Antibacterial activity (E. coli) |  | 6 | 6 | 6 | 4 | 6 |
| Antibacterial activity (S. aureus) |  | 4 | 4 | 4 | 3 | 4 |
| Notched Izod impact strength | 23° C. | 18 | 19 | 21 | 20 | 17 |
|  | −30° C. | 10 | 11 | 12 | 12 | 10 |
| MI |  | 2.2 | 2.3 | 2.3 | 2.5 | 2.0 |

*parts by weight: parts by weight relative to 100 parts by weight of thermoplastic resin (A)

TABLE 3

|  |  | Comparative Example |  |  |  |  |
|---|---|---|---|---|---|---|
|  |  | 1 | 2 | 3 | 4 | 5 |
| (A) (wt %) | (A1) | 23 | 23 | 23 | 23 | 23 |
|  | (A2) | 27 | 27 | 27 | 27 | 27 |
|  | (A3) | 50 | 50 | 50 | 50 | 50 |
| (B) (parts by weight) | (B1) | — | — | — | 4 | 4 |
|  | (B2) | 4 | — | — | — | — |
|  | (B3) | — | 4 | — | — | — |
| (C) (parts by weight) | (C1) | 0.3 | 0.3 | 0.3 | — | — |
|  | (C2) | — | — | — | — | 0.3 |
| Color variation (ΔE) |  | 2.5 | 2.5 | 4.0 | 1.5 | 1.5 |
| Antibacterial activity (E. coli) |  | 1.5 | 1.5 | 0 | 6 | 6 |
| Antibacterial activity (S. aureus) |  | 1.0 | 1.0 | 0 | 4 | 4 |
| Notched Izod impact strength | 23° C. | 15 | 15 | 20 | 14 | 14 |
|  | −30° C. | 8 | 8 | 12 | 6 | 6 |
| MI |  | 2.1 | 2.1 | 2.2 | 2.2 | 2.2 |

*parts by weight: parts by weight relative to 100 parts by weight of thermoplastic resin (A)

From the results, it could be seen that the thermoplastic resin composition according to the present invention had good properties in terms of weather resistance, antibacterial properties, impact resistance, flowability, and the like.

Conversely, it could be seen that the thermoplastic resin compositions of Comparative Examples 1 and 2 prepared using the zinc oxides (B2) and (B3) instead of the zinc oxide (B1) suffered from deterioration in weather resistance, antibacterial properties, impact resistance, and the like. It could be seen that the thermoplastic resin composition of Comparative Example 3 prepared without using zinc oxide did not exhibit antibacterial properties and suffered from deterioration in weather resistance and the thermoplastic resin composition of Comparative Example 4 prepared without using the alkyl phosphate suffered from deterioration in impact resistance. It could be seen that the thermoplastic resin composition of Comparative Example 5 prepared using triphenyl phosphate (C2) instead of the alkyl phosphate (C1) suffered from deterioration in impact resistance.

It should be understood that various modifications, changes, alterations, and equivalent embodiments can be made by those skilled in the art without departing from the spirit and scope of the invention.

The invention claimed is:

1. A thermoplastic resin composition comprising:
a rubber-modified vinyl graft copolymer;
an aromatic vinyl copolymer resin;
zinc oxide having an average particle diameter of about 0.5 μm to about 3 μm, a BET specific surface area of about 1 m$^2$/g to about 10 m$^2$/g, a peak position degree (2θ) in the range of about 35° to about 37° and a crystallite size of about 1,000 Å to about 2,000 Å in X-ray diffraction (XRD) analysis, as calculated by Equation 1:

$$\text{Crystallite size } (D) = \frac{K\lambda}{\beta \cos\theta} \quad \text{[Equation 1]}$$

where K is a shape factor, λ is an X-ray wavelength, β is an FWHM value (degree) of an X-ray diffraction peak, and θ is a peak position degree; and
a $C_{10}$ to $C_{20}$ alkyl phosphate.

2. The thermoplastic resin composition according to claim 1, comprising: about 100 parts by weight of a thermoplastic resin comprising about 10 wt % to about 40 wt % of the rubber-modified vinyl graft copolymer and about 60 wt % to about 90 wt % of the aromatic vinyl copolymer resin; about 0.1 to about 10 parts by weight of the zinc oxide; and about 0.01 to about 5 parts by weight of the alkyl phosphate.

3. The thermoplastic resin composition according to claim 1, wherein the rubber-modified vinyl graft copolymer is prepared by graft polymerization of a monomer mixture comprising an aromatic vinyl monomer and a vinyl cyanide monomer to a rubber polymer.

4. The thermoplastic resin composition according to claim 1, wherein the aromatic vinyl copolymer resin is a polymer of an aromatic vinyl monomer and a monomer copolymerizable with the aromatic vinyl monomer.

5. The thermoplastic resin composition according to claim 1, wherein the zinc oxide has a peak intensity ratio (B/A) of about 0.01 to about 1.0, where A indicates a peak in the wavelength range of 370 nm to 390 nm and B indicates a peak in the wavelength range of 450 nm to 600 nm in photoluminescence measurement.

6. The thermoplastic resin composition according to claim 1, wherein the zinc oxide and the alkyl phosphate are present in a weight ratio of about 4:1 to about 40:1.

7. The thermoplastic resin composition according to claim 1, wherein the thermoplastic resin composition has a color variation (ΔE) of about 0.5 to about 1.7, as calculated by Equation 2 based on initial color values ($L_0^*$, $a_0^*$, $b_0^*$) measured on an injection-molded specimen having a size of 50 mm×90 mm×3 mm and color values ($L_1^*$, $a_1^*$, $b_1^*$) of the specimen measured after weathering testing for 300 hours in accordance with ASTM D4459:

$$\text{Color variation } (\Delta E) = \sqrt{(\Delta L^*)^2 + (\Delta a^*)^2 + (\Delta b^*)^2} \quad \text{[Equation 2]}$$

where ΔL* is a difference ($L_1^* - L_0^*$) between L* values before and after weathering test, Δa* is a difference ($a_1^* - a_0^*$) between a* values before and after weathering test, and Δb* is a difference ($b_1^* - b_0^*$) between b* values before and after weathering test.

8. The thermoplastic resin composition according to claim 1, wherein the thermoplastic resin composition has an antibacterial activity of about 2 to about 7 against each of Staphylococcus aureus and Escherichia coli, as measured after inoculation of 5 cm×5 cm specimens with Staphylococcus aureus and Escherichia coli, respectively, and culturing under conditions of 35° C. and 90% RH for 24 hours in accordance with JIS Z 2801.

9. The thermoplastic resin composition according to claim 1, wherein the thermoplastic resin composition has a notched Izod impact strength of about 17 kgf·cm/cm to about 30 kgf·cm/cm, as measured on a 6.4 mm thick specimen at 23° C. in accordance with ASTM D256.

10. The thermoplastic resin composition according to claim 1, wherein the thermoplastic resin composition has a notched Izod impact strength of about 10 kgf·cm/cm to about 20 kgf·cm/cm, as measured on a 6.4 mm thick specimen at −30° C. in accordance with ASTM D256.

11. The thermoplastic resin composition according to claim 1, wherein the thermoplastic resin composition has a melt-flow index (MI) of about 2 g/10 min to about 5 g/10 min, as measured under conditions of 200° C. and a load of 5 kg in accordance with ASTM D1238.

12. A molded product formed of the thermoplastic resin composition according to claim 1.

13. The thermoplastic resin composition according to claim 7, wherein the thermoplastic resin composition has:
  an antibacterial activity of about 2 to about 7 against each of *Staphylococcus aureus* and *Escherichia coli*, as measured after inoculation of 5 cm×5 cm specimens with *Staphylococcus aureus* and *Escherichia coli*, respectively, and culturing under conditions of 35° C. and 90% RH for 24 hours in accordance with JIS Z 2801;
  a notched Izod impact strength of about 17 kgf·cm/cm to about 30 kgf·cm/cm, as measured on a 6.4 mm thick specimen at 23° C. in accordance with ASTM D256;
  a notched Izod impact strength of about 10 kgf·cm/cm to about 20 kgf·cm/cm, as measured on a 6.4 mm thick specimen at −30° C. in accordance with ASTM D256; and
  a melt-flow index (MI) of about 2 g/10 min to about 5 g/10 min, as measured under conditions of 200° C. and a load of 5 kg in accordance with ASTM D1238.

14. The thermoplastic resin composition according to claim 13, wherein the thermoplastic resin composition has a color variation ($\Delta E$) of about 0.9 to about 1.5, as calculated by Equation 2 based on initial color values ($L_0^*$, $a_0^*$, $b_0^*$) measured on an injection-molded specimen having a size of 50 mm×90 mm×3 mm and color values ($L_1^*$, $a_1^*$, $b_1^*$) of the specimen measured after weathering testing for 300 hours in accordance with ASTM D4459:

$$\text{Color variation } (\Delta E) = \sqrt{(\Delta L^*)^2 + (\Delta a^*)^2 + (\Delta b^*)^2} \qquad \text{[Equation 2]}$$

where $\Delta L^*$ is a difference ($L_1^* - L_0^*$) between L* values before and after weathering test, $\Delta a^*$ is a difference ($a_1^* - a_0^*$) between a* values before and after weathering test, and $\Delta b^*$ is a difference ($b_1^* - b_0^*$) between b* values before and after weathering test.

* * * * *